United States Patent [19]
Kung

[11] Patent Number: 4,788,112
[45] Date of Patent: Nov. 29, 1988

[54] RECHARGEABLE STORAGE BATTERY

[76] Inventor: Chin-Chung Kung, P.O. Box 10160, Taipei, Taiwan

[21] Appl. No.: 86,300

[22] Filed: Aug. 17, 1987

[51] Int. Cl.[4] .............................................. H01M 2/12
[52] U.S. Cl. ........................................ 429/54; 429/57; 429/61; 429/86; 429/94
[58] Field of Search ...................... 429/54, 61, 55, 57, 429/72, 82, 86, 89, 94, 163, 164

[56] References Cited

U.S. PATENT DOCUMENTS

| | | | |
|---|---|---|---|
| 3,436,273 | 4/1969 | Gratzmuller | 429/54 |
| 3,862,861 | 1/1975 | McClelland | 429/57 |
| 4,078,121 | 3/1978 | Gratzmuller | 429/54 |

*Primary Examiner*—Anthony Skapars

[57] ABSTRACT

A rechargeable storage battery includes a container, a gas venting and circuit-breaker device and a concentric electrode assembly comprised of plural negative electrode plates, positive electrode plates and separators each disposed between every two adjacent, opposite plates, wherein the gas venting and circuit-breaker device may absorb the entrained electrolyte and may disconnect a positive terminal of the cell as biased by the excessive gas pressure during overcharged operation for safety purpose; and the concentric electrode plates may overcome the breaking or deformation drawbacks since the plates are concentrically wrapped up in one-fold, instead of a conventional spiral-winding electrode configuration which is continuously rolled up by many turns.

4 Claims, 2 Drawing Sheets

RECHARGEABLE STORAGE BATTERY

BACKGROUND OF THE INVENTION

Donald H. Meclelland disclosed a Maintenance-free type Lead Acid Cell in his U.S. Pat. No. 3,862,861 which is characterized by structurally free, non-self-supporting plates separated from one another with highly absorbent flexible separators containing electrolyte and constrained within a container such that mechanical integrity is imparted to obtain a unitary self-supporting structure. However such a lead acid cell has the following defects:

1. Even such a cell provides a valve means 23, a yieldable cap of the central vent of the cell, to release any excessively high pressure in the cell and if such a cell is inferentially expected to be a rechargeable storage battery as subject to a overcharged condition, the electric terminals are still connected without being cut off, thereby resulting in much loss of entrained electrolyte droplets as laden in the venting gas and possibly causing unsafe situation.

2. One of its preferred embodiments disclosed a spiral configuration by spirally winding the positive and negative plates, and the separator material disposed between the two plates, which however may be squeezed to deform the electrodes or to break the separator to cause short-circuit drawback between the electrodes to thereby reduce the output electricity of the plates and decrease the overall efficiency of the cell.

The present inventor has found the defects of the prior Donald's cell and invented the present rechargeable storage battery and its making method.

SUMMARY OF THE INVENTION

The object of the present invention is to provide a rechargeable storage battery including a container, a gas venting and circuit-breaker means and a concentric electrode assembly comprised of plural negative electrode plates, positive electrode plates and separators each disposed between every two adjacent, opposite plates, wherein the gas venting and circuit-breaker means may absorb the entrained electrolyte and may disconnect a positive terminal of the cell as biased by the excessive gas pressure during overcharged operation for safety purpose; and the concentric electrode plates may overcome the breaking or deformation drawbacks since the plates are concentrically wrapped up in one-fold, instead of a conventional spiral-winding electrode configuration which is continuously rolled up by many turns.

DETAILED DESCRIPTION

Figure 1:
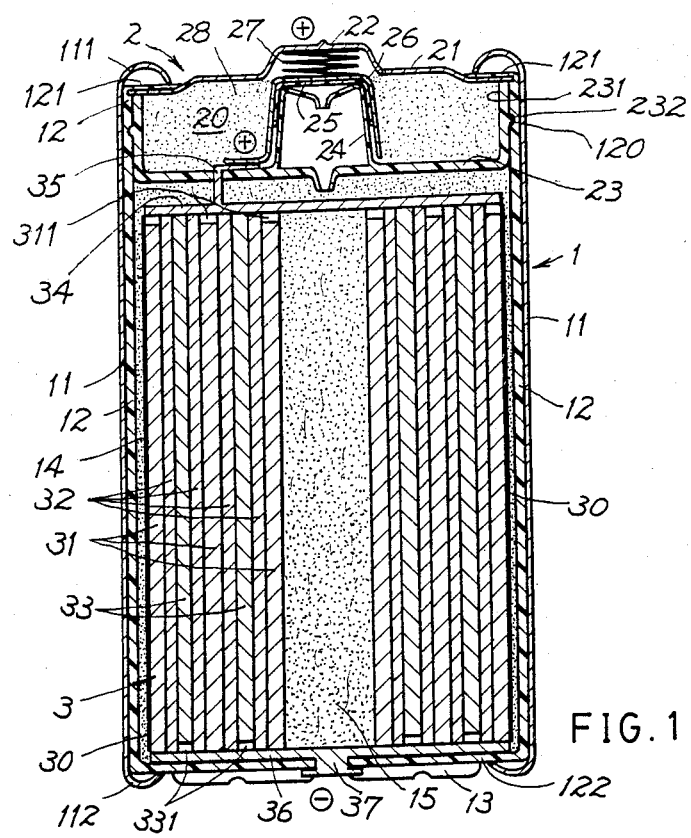
FIG. 1 is a sectional drawing of the present invention.
Figure 2:
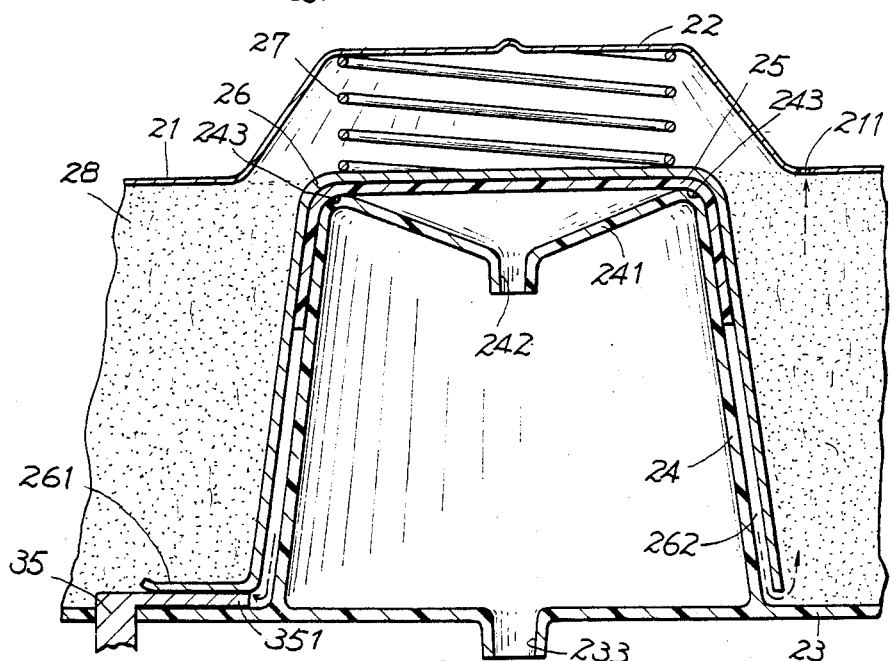
FIG. 2 is an illustration showing a gas venting and circuit-breaker means of the present invention.

As shown in FIGS. 1 and 2, the present invention comprises: a container 1, a gas venting and circuit-breaker means 2, and a concentric electrode assembly 3.

The container 1 includes: an outer cylindrical casing 11 preferably made of stainless steel plate having an upper crimped edge 111 and a lower crimped edge 112, an inner lining 12 encased in the outer casing 11 preferably made of insulating plastic materials and having an upper edge 121 packed between an upper crimped edge 111 and a top cover 21, a bottom portion 1 and a ring groove 120 formed on its upper inside wall, a bottom plate 13, secured under bottom portion 122, a side-portion electrolyte absorber 14, and a core-portion electrolyte absorber 15. The electrolyte absorbers may be made of chips, sliced parts, or mats of microporous materials, such as: polymers or composites of high molecular weight impregnated on paper having strong capability for absorbing liquid.

The gas venting and circuit-breaker means 2 includes: a top cover 21 having a positive terminal 22 formed as a cap on its central portion, a partition plate 23 having a cylindrical wall 231 secured under the top cover 21, having an extension ring 232 engaged with the ring groove 120 of the container 1 and having a neck portion 233 formed with a through hole and extending downwardly from the plate 23, a venting stack 24 extending upwardly from the plate 23 having a baffle 241 shaped as an inverse truncated cone formed on the stack top and having a neck portion with a through hole formed on a central portion of the baffle 241 and having a recess 243 circumferentially formed on an upper rim of the stack 24, an elastomer cap 25 yieldably sealing on the upper portion of the stack 24, a contactor bell 26 disposed around the stack 24 as packed by the elastomer cap 25 having a contactor plate 261 protruding transversely from its lower perimeter to normally touch a spring plate 351 of a positive-terminal connector 35 electrically connected with the positive electrode plates 33 and forming an aperture 262 between the stack 24 and the bell 26, a metallic tensioning spring 27 resiliently retaining the bell 26 downwardly as backed against the positive terminal 22, and a neutralizing absorber 28 filled in a degassing chamber 20 defined among the top cover 21, the partition plate 23 and the bell 26 and also made of microporous materials, such as resin impregnated paper, glass fibers, and foam, which are soaked with neutralizing agent such as lime water adapted for absorbing and neutralizing any entrained electrolyte spilt through the aperture 262.

The top cover 21 is formed with a venting hole 211 thereon for releasing a gas at excessively high pressure. The elastomer cap 25 should be able to retain an internal pressure as normally operated and may be biased upwardly to relieve the high-pressure gas. The spring 27 can be selected to conform with a preset working pressure of the battery.

The concentric electrode assembly 3 includes: a plurality of negative electrode plates 31, separators 32 and positive electrode plates 33, every two adjacent, opposite plates 31, 33 being sandwiched with each separator 32 such that each negative electrode plate 31, each separator 32 and each positive electrode plate 33 are concentrically wrapped up subsequently and cyclically from a core-portion electrolyte absorber 15 until finally being encased by a wrapping cloth 30 within the side-portion absorber 14; an upper electricity collector 34 welded and secured above the positive electrode plates 33 as spaced apart from each negative plate 11 with a void 311 having a length of 1–2 mm; a positive-terminal connector 35 protruding upwardly from the upper collector 34 through the partition plate 23 and extending transversely a spring plate 351 on its upper end in the degassing chamber 20; a lower electricity collector 36 welded and secured under the negative electrode plates 31 as spaced apart from each positive plate with a void 331; and a negative terminal 37 protruding downwardly from the lower collector 36 through the bottom plate 13.

The separator 32 may be made of microporous materials as aforementioned. The wrapping cloth 30 may be made of poly-propylene unwoven cloth. The separator 32 is provided for absorbing and retaining an electrolyte such as hydrosulfuric acid (specific gravity: 1.25), of which one gram of separator may absorb 18 grams of $H_2SO_4$. The collector 34 is drilled with plural perforations occupying about 40% of the collector area. Each perforation has a diameter less than 1 mm.

When making the electrode plate 31 or 33, a long strip of lead substrate plate having 0.06% calcium and tin 1% by weight is punched to form a grid having perforations occupying 80% of the whole area of the plate, and then coated with lead paste consisting of lead, litharge and graphite (poly-propylene short staples are added for positive plate and barium sulfate is added for negative plate) as mixed with dilute hydro-sulfuric acid. The paste coated plates are placed in dilute $H_2SO_4$ bath for coagulating the paste and then electrolyzed to form electrode plates. The plates are washed in water by applying ultrasonic wave thereto and are drained to remove the excess water. The wet grid plates are then cut into the desired length and size.

Figure 3:
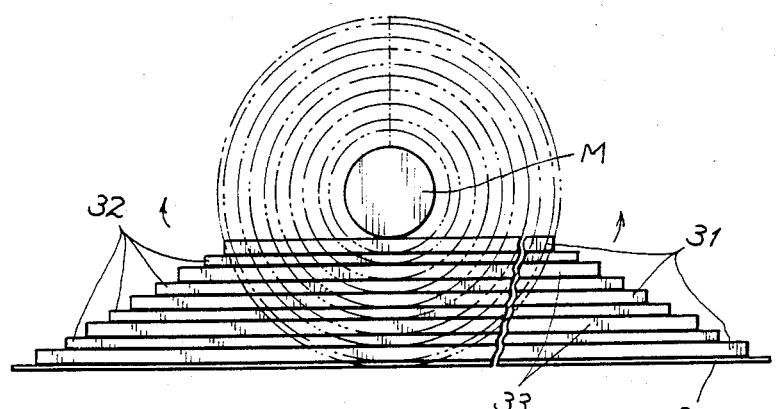
FIG. 3 shows a wrapping operation for the plural electrodes and separators of the present invention.

The formed grid plates 31, 33 are stacked as shown in FIG. 3 in which an uppermost layer of negative electrode plate 31 is laid under a mandrel M. Then, a layer of separator 32 and a layer of positive electrode plate 33 are subsequently laid under the upper negative plate 31 until the lowest PP unwoven cloth 30. Each layer of plate or separator should have a length of 3.1416 times its diameter when concentrically wound. The plates 31, 33 and the sandwiched separators 32 are integratedly wrapped up around the central mandrel M as shown in dotted line. The outermost layer of cloth 30 is wound and sealed by a hot-melt adhesive or other bonding methods, to encase all said plates and separators.

Figure 4:
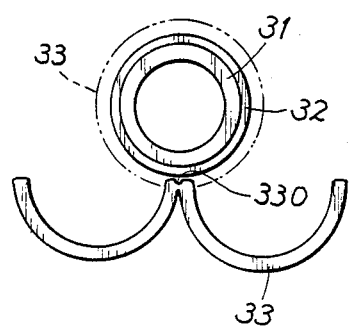
FIG. 4 shows a wrapping operation for a double half-circle electrode in accordance with the present invention.
Figure 5:
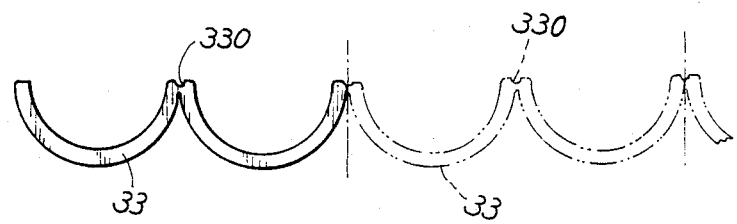
FIG. 5 shows the double half-circle electrode of the present invention.

If the electrode plate is made of slightly hard plate having 1.75% by weight of antimony of the lead plate, the electrode grid is first molded to form a corrugated strip having linear plural double half-circle units as shown in FIGS. 5 and 4, of which a recess 330 is formed between the two half circles of the unit for convenient winding operation. The multiple layers of plates 31, 33 and separator 32 are then concentrically wrapped up to form the electrode assembly of the present invention.

After assemblying all plates and separators, the central mandrel M is withdrawn and filled with the core-portion electrolyte absorber 15 as shown in FIG. 1. The illustration shown in FIG. 1 and the present invention merely discloses three negative electrode plates 31 and two positive electrode plates 33. However, the number of the plates 31, or 33 are not limited in this invention.

In using the present invention, the positive electricity is collected from upper collector 34 and then transmitted through positive-terminal connector 35, spring plate 351, contactor plate 261, bell 26, spring 27 and the positive terminal 22; while the negative electricity is transmitted from lower collector 36 and negative terminal 37, so that a direct current can be utilized by electrically coupling the positive terminal 22 and the negative terminal 37.

When the battery is charged and especially during the overcharge period, the electrolyte as laden in gas, when passing through the absorbers 14, 15, may be absorbed. Still, the gas if subject under excessive high pressure may bias the elastomer cap 25 and the bell 26 against the spring 27 to escape through aperture 262 and traces of electrolyte therein may be absorbed and neutralized by the neutralizing absorber 28 in the degassing chamber 20, to finally discharge through venting hole 211. In the battery of the present invention, any trace of entrained electrolyte may not spill over the neck portions 233, 242 respectively formed on the partition plate 23 and the baffle 241.

If the battery is under excessive high pressure as overcharged, the high gas pressure if being larger than the setting resilience force of the spring 27 may bias the cap 25, the bell 26 upwardly against the spring 27 to thereby disconnect the contactor plate 261 from the spring plate 351 to cut off the charging current for safety purpose.

Since the concentric electrode plates 31, 33 of the present invention as defined among the container 1, and the partition plate 23 are concentrically wrapped up in a one-fold step, the unexpected breakage or deformation of the electrodes as wound can therefore be prevented.

I claim:
1. A rechargeable storage battery comprising:
   a container having an outer cylindrical casing, an inner lining encased in said outer casing, and a bottom plate secured under the inner lining;
   a gas venting and circuit-breaker means including: a top cover having a positive terminal formed as a cap on its central portion and a venting hole therethrough, a partition plate having a cylindrical wall secured under said top cover and engaged on an upper portion of said inner lining having a neck portion with a through hole extending downwardly from said partition plate, a venting stack extending upwardly from said partition plate having a baffle shaped as an inverse truncated cone formed on the stack top and having a neck portion with a through hole formed on a central portion of said baffle, an elastormer cap yieldably sealing on the the upper portion of said stack, a contactor bell disposed around said stack as packed by said elastomer cap having a contactor plate protruding transversely from a lower perimeter of said bell and forming an aperture between said bell and said stack, a metallic tensioning spring resiliently retaining said bell downwardly as backed against said positive terminal, and a neutralizing absorber filled in a degassing chamber as defined among said top cover, said partition plate and said bell; and a concentric electrode assembly including:
   a plurality of negative electrode plates, separators for retaining an electrolyte and positive electrode plates of which every two adjacent, opposite plates are sandwiched with each separator and are concentrically wrapped up subsequently and cyclically from a core-portion electrolyte absorber inserted in a central portion of the asembly and finally encased by a wrapping cloth and a side-portion electrolyte absorber, an upper electricity collector welded and secured above said positive electrode plates as spaced apart from each negative plate with a void, a positive-terminal connector protruding upwardly from said upper collector through said partition plate and extending transversely a spring plate on the upper end of said connector in said degassing chamber normally touching said contactor plate of said bell for electrically connecting said bell, said tensioning spring and said positive terminal, a lower electricity collector welded and secured under said negative electrode plates as spaced from each positive plate with a void, and a negative terminal protruding downwardly from said lower collectror through said bottom plate, whereby upon the acting of an excessive gas pressure as overcharged in said battery, the gas pressure may bias the elastomer cap and the bell upwardly against said tensioning spring to disconnect said contactor plate from said spring plate of said positive-terminal connector to cut off a charging current and the gas may escape through an aperture between said bell and said stack to let the entrained electrolyte being absorbed and neutralized by said absorber in said degassing chamber and finally discharge through said venting hole.

2. A storage battery according to claim 1, wherein said stack is circumferentially formed with a recess on an upper rim of said stack.

3. A storage battery according to claim 1, wherein said upper collector is drilled with plural perforations occupying an area less than forty percent of the whole area of the collector.

4. A battery according to claim 1, wherein the length of each electrode plate before being concentrically wound is equal to 3.1416 times of its diameter as concentrically wrapped in the electrode assembly.

* * * * *